United States Patent Office 3,050,315
Patented Aug. 21, 1962

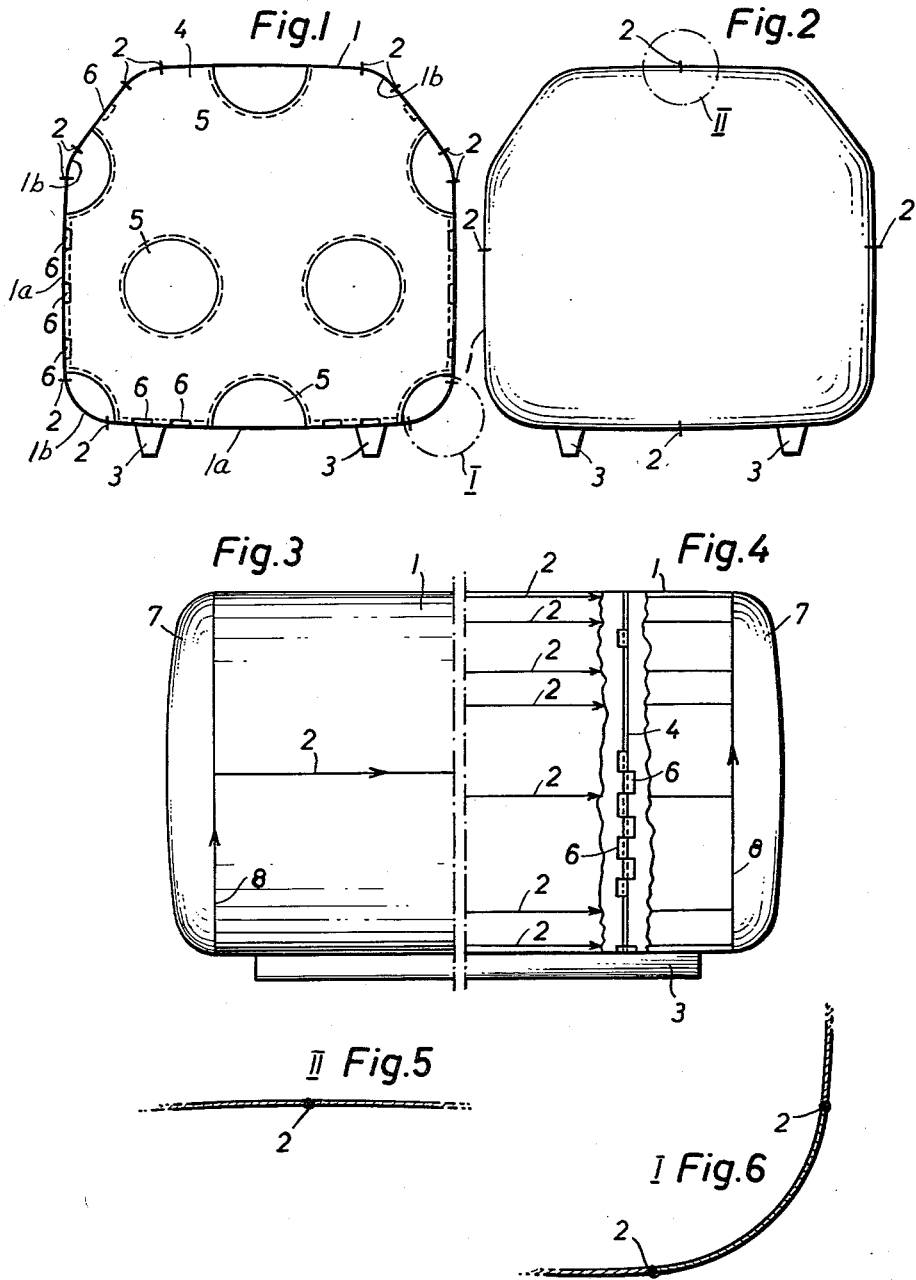

3,050,315
TANKS FOR TANK VEHICLES
Adolf Kindler, Kassel, and Carl-Heinz Eckhardt, Minden, Westphalia, Germany, assignors to Gebruder Crede & Co. G.m.b.H., Kassel-Niederzwehen, Germany
Filed Jan. 29, 1960, Ser. No. 5,529
Claims priority, application Germany Jan. 31, 1959
1 Claim. (Cl. 280—5)

This invention relates to tanks constructed specifically for railway tank vehicles and connected over all or part of their length to the chassis or underframe of the vehicle so as to be self-supporting. Previously it has been usual to construct such tanks from a number of annular plates connected by weld seams running transversely to the length of the vehicle. These transverse seams are sensitive to the stresses parallel to the length of the vehicle which occur in completely, or even only partly, self-supporting tanks.

According to the present invention in a tank, connected over all or part of its length to the chassis or underframe of a rail-borne car so as to be self-supporting, the walls of the tank parallel to the length of the vehicle are made up of plates joined, at least in those zones which are subjected to stress by forces acting parallel to the length of the vehicle, solely by welds parallel to this direction.

With such a construction the welds run parallel to the stresses and are thus less likely to fail.

Owing to the direction of the weld seams the general cross-section of the tank can be made substantially rectangular. This gives an increased bending resistance and also a better utilization of the vehicle profile permitted for railway cars.

Preferably those parts of the tank which are subjected to the greater stresses are made from thicker plates and may also be reinforced by, for example, hollow sections welded on externally.

Two embodiments of the invention will now be described in more detail, by way of example only, with reference to the accompanying drawing in which:

FIGURE 1 is a cross-section through one form of tank according to the invention;

FIGURE 2 is an end view of another form of construction of tank;

FIGURE 3 is a side elevation of part of the tank shown in FIGURE 2;

FIGURE 4 is a side elevation of part of the tank shown in FIGURE 1; and

FIGURES 5 and 6 show details of FIGURES 2 and 1, respectively, on a larger scale.

In FIGURE 1 the tank shell 1 is composed of alternately flat and curved metal plates 1a, 1b connected to one another by means of longitudinal weld seams 2, both sets of plates extending parallel to the length of the vehicle (i.e. normally to the plane of FIGURE 1). The tank is reinforced on its underside by two hollow sections 3. Mounted within the tank shell are a number of surge plates 4 provided with apertures 5. These have the effect of damping the internal surges in the liquid load on acceleration or deceleration of the vehicle. Each surge plate is fixed to the inside of the tank shell by means of lugs 6 bent over alternately in different directions and welded to the shell along their edges parallel to the length of the vehicle only, as best seen in FIGURE 4. The tank is fitted with dished end walls 7 which are joined to the shell 1 by welds 8 extending transversely of the length of the vehicle. It will be noted that certain of the relatively wide flat plates 1a define the horizontal and vertical sides of the generally rectangular cross-section of shell 1 and that the narrower curved plates 1b between plates 1a, positioned at the corners or bends of the shell, merge tangentially with the adjoining plates 1a.

The tank illustrated in FIGURES 2 and 3 is made up of fewer plates than the one just described but the principles behind its construction are identical. FIGURES 6 and 5 show in more detail the weld seams and parts of the plates within circles I and II in FIGURES 1 and 2, respectively.

In the zones of the tank where the stresses due to forces parallel to the length of the vehicle are small or substantially non-existent, such as in certain parts of the top of the tank, there may be transverse weld seams, but, as in the described embodiments these may be dispensed with completely in the walls parallel to the length of the vehicle.

We claim:

In a railway tank vehicle provided with spaced mounting means, a self-supporting tank bridging said mounting means, said tank having an elongated hollow body provided with end closures, said body being of generally rectangular cross-section and being constituted by contiguous, longitudinally extending flat and curved plates alternating in peripheral direction and welded to one another along longitudinal seams, said flat plates including a first horizontal plate defining a bottom wall, a second horizontal plate defining a top wall and two vertical plates defining respective side walls of said body, said curved plates having a width substantially less than that of said horizontal and vertical plates and merging tangentially with the adjoining flat plates respectively welded thereto; and at least one apertured surge plate extending transversely within said body in contact with at least said horizontal and vertical plates, said surge plate being provided with peripheral lugs extending some in one longitudinal direction and some in the opposite longitudinal direction along the inner wall surface of said body and welded thereto only along their longitudinal edges.

References Cited in the file of this patent

UNITED STATES PATENTS

| | | |
|---|---|---|
| 1,040,401 | Perry | Oct. 8, 1912 |
| 2,094,336 | Willetts | Sept. 28, 1937 |
| 2,105,302 | Thwaits | Jan. 11, 1938 |
| 2,211,239 | Liston | Aug. 13, 1940 |
| 2,239,507 | Pierce | Apr. 22, 1941 |

FOREIGN PATENTS

| | | |
|---|---|---|
| 736,757 | Great Britain | Sept. 14, 1955 |